United States Patent
Chen

(10) Patent No.: US 10,945,186 B2
(45) Date of Patent: Mar. 9, 2021

(54) MOBILE TERMINAL AND DATA TRANSMISSION METHOD

(71) Applicant: Guangdong OPPO Mobile Telecommunications Corp., Ltd., Guangdong (CN)

(72) Inventor: Biao Chen, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 0 days.

(21) Appl. No.: 16/443,352

(22) Filed: Jun. 17, 2019

(65) Prior Publication Data

US 2019/0387450 A1    Dec. 19, 2019

(30) Foreign Application Priority Data

Jun. 19, 2018 (CN) .......................... 201810629857.8

(51) Int. Cl.
| | | |
|---|---|---|
| *H04W 40/02* | (2009.01) | |
| *H04B 1/40* | (2015.01) | |
| *H04W 84/12* | (2009.01) | |

(52) U.S. Cl.
CPC .............. *H04W 40/02* (2013.01); *H04B 1/40* (2013.01); *H04W 84/12* (2013.01)

(58) Field of Classification Search
CPC ..... H04W 40/02; H04W 84/12; H04W 84/18; H04W 40/38; H04W 88/06; H04W 84/04;
(Continued)

(56) References Cited

U.S. PATENT DOCUMENTS

| | | | |
|---|---|---|---|
| 2007/0066278 A1 | 3/2007 | Hong | |
| 2008/0125039 A1* | 5/2008 | Glinka | H04W 88/04 |
| | | | 455/41.2 |

(Continued)

FOREIGN PATENT DOCUMENTS

| | | |
|---|---|---|
| CN | 106537797 A | 3/2017 |
| CN | 106849973 A | 6/2017 |

(Continued)

OTHER PUBLICATIONS

Scaglione, Anna, and Yao-Win Hong. "Opportunistic large arrays: Cooperative transmission in wireless multihop ad hoc networks to reach far distances." IEEE transactions on Signal Processing 51.8 (2003): 2082-2092. (Year: 2003).*

(Continued)

*Primary Examiner* — Sharad Rampuria

(57) ABSTRACT

Described herein includes a mobile terminal, a data transmission method and a related product used in a mobile terminal. The method comprises: in response to detecting a starting request for a preset application, starting an enhanced signal transceiver function of a mobile terminal; performing scanning and connecting operations and establish an Ad Hoc network with another device, wherein a distance between the another device and the mobile terminal is less than or equal to a preset distance; and performing transmission of target data in the Ad Hoc network. The embodiments of the present disclosure are conducive to enlarging an application scope of a communication function of a local area network for mobile terminals, meeting various requirements of specific scenarios such as the absence of a mobile network, and expanding functionality and applicability.

19 Claims, 8 Drawing Sheets

(58) Field of Classification Search
CPC ....... H04W 4/021; H04B 1/40; H04B 1/0003; H04B 2001/0408; H04B 1/005; H04B 7/15535; H04M 1/7253; H04L 12/4604
See application file for complete search history.

(56) References Cited

U.S. PATENT DOCUMENTS

| | | | |
|---|---|---|---|
| 2009/0168650 A1 | 7/2009 | Kesselman | |
| 2012/0329395 A1* | 12/2012 | Husted | H04B 1/406 455/41.2 |
| 2013/0148643 A1* | 6/2013 | Abraham | H04W 84/12 370/338 |
| 2013/0182695 A1* | 7/2013 | Hahm | H04W 84/12 370/338 |
| 2013/0335274 A1 | 12/2013 | Lo et al. | |
| 2016/0261976 A1 | 9/2016 | Butler et al. | |

FOREIGN PATENT DOCUMENTS

| | | |
|---|---|---|
| CN | 107222233 A | 9/2017 |
| CN | 206650670 U | 11/2017 |
| CN | 108848570 A | 11/2018 |
| EP | 1826954 B1 | 9/2009 |
| WO | 2013109024 A1 | 7/2013 |
| WO | 2017004180 A2 | 1/2017 |
| WO | 2017078781 A1 | 5/2017 |
| WO | 2018058112 A1 | 3/2018 |

OTHER PUBLICATIONS

International search report issued in corresponding international application No. PCT/CN2019/091714, dated Apr. 9, 2019 (4 pages).
European search report issued in corresponding European application No. EP19180691, dated Oct. 17, 2019 (16 pages).
European search report, EP19180691, dated Jul. 2, 2020 (19 pages).
European search report, EP19180691, dated Feb. 7, 2020 (19 pages).
Chinese First office action with English Translation of Chinese application No. 201810629857.8, dated Dec. 8, 2020 (25 pages).

* cited by examiner

MOBILE TERMINAL AND DATA TRANSMISSION METHOD

CROSS-REFERENCE TO RELATED APPLICATION(S)

This application claims priority to Chinese Patent Application No. 201810629857.8, filed on Jun. 19, 2018, the contents of which are herein incorporated by reference in their entireties.

TECHNICAL FIELD

The present disclosure relates to the technical field of mobile terminals, and in particular to a mobile terminal, a data transmission method, and a related product.

BACKGROUND

At present, mobile terminals on the market are generally provided with a Bluetooth module or a Wi-Fi module, and can implement point-to-point data sharing of a local area network in a short distance. However, the data transmission distance is limited, and long-distance data sharing cannot be implemented.

SUMMARY

In a first aspect, an embodiment of the present disclosure provides a mobile terminal comprising an application processor, a cellular network communication circuit, a local area network (LAN) communication circuit, a first antenna, and a second antenna; wherein, the application processor, the cellular network communication circuit, and the LAN communication circuit implement mutual communication through a global communication interface, the cellular network communication circuit is connected with the first antenna, and the LAN communication circuit is connected with the second antenna; when the application processor implements an enhanced signal transceiver function in a LAN through the LAN communication circuit, the cellular network communication circuit, and the first antenna, an effective transmission distance of a signal transmitted by the mobile terminal is larger than a preset distance.

In a second aspect, an embodiment of the present disclosure provides a data transmission method applied in a mobile terminal, the mobile terminal is the mobile terminal according to any of the first aspect, the method comprises: in response to detecting a starting request for a preset application, starting the enhanced signal transceiver function of the mobile terminal; performing scanning and connecting operations and establish an Ad Hoc network with another device, wherein a distance between the another device and the mobile terminal is less than or equal to the preset distance; and performing transmission of target data in the Ad Hoc network.

In a third aspect, an embodiment of the present disclosure provides a data transmission device applied in the mobile terminal according to the first aspect, the data transmission device comprises a processing circuit and a communication circuit, wherein, the processing circuit is configured to: in response to detecting a starting request for a preset application, start the enhanced signal transceiver function of the mobile terminal; perform scanning and connecting operations through the communication circuit and establish an Ad Hoc network with another device, wherein a distance between the another device and the mobile terminal is less than or equal to the preset distance; and perform transmission of target data in the Ad Hoc network.

In a fourth aspect, an embodiment of the present disclosure provides a mobile terminal comprising an application processor, a storage, a communication interface, and one or more program(s); wherein, the one or more program(s) is/are stored in the storage, and is/are configured to be executed by the application processor; the program(s) comprise(s) instruction configured to execute steps of any method of the first aspect of the embodiment of the present disclosure.

In a fifth aspect, an embodiment of the present disclosure provides a computer readable storage medium; wherein, the computer readable storage medium stores a computer program configured for electronic data exchange; wherein, the computer program enables a computer to execute some or all steps according to any method of the second aspect of the embodiment of the present disclosure.

In a sixth aspect, an embodiment of the present disclosure provides a computer program product; wherein, the computer program product comprises a non-transitory computer readable storage medium storing a computer program, the computer program can be operated to enable a computer to execute some or all steps according to any method of the second aspect of the embodiment of the present disclosure. The computer program product can be a software installment package.

BRIEF DESCRIPTION OF DRAWINGS

In order to describe the technical solutions in the embodiments of the present disclosure or in the prior art more clearly, drawings that need to be used in the description of the embodiments or the prior art will be briefly described below. Obviously, the drawings in the following description only represent some embodiments of the present disclosure. For those of ordinary skill in the art, other drawings may also be obtained based on these drawings without any creative work.

DETAILED DESCRIPTION

In order to enable those of ordinary skill in the art to better understand the solutions of the present disclosure, the technical solutions in the embodiments of the present disclosure will now be clearly and completely described below in connection with the accompanying drawings in the embodiments of the present disclosure. Obviously, the described embodiments are merely some embodiments of the present disclosure and not all embodiments. Based on the embodiments of the present disclosure, all other embodiments obtained by a person of ordinary skill in the art without creative efforts shall fall within the protection scope of the present disclosure.

The terms "first", "second", and the like in the specification, the claims, and the aforesaid drawings of the present disclosure are used to distinguish different objects and not to describe specific orders. Further, the terms "comprise" and "have" and any variants thereof are intended to encompass non-exclusive inclusions. For example, a process, method, system, product, or apparatus comprising a series of steps or components is not limited to the listed steps or components, but may optionally further include steps or components that are not listed, or alternatively further include other steps or components inherent to the process, method, system, product, or apparatus.

References herein to "an embodiment" mean that a particular feature, structure, or characteristic described in connection with an embodiment can be included in at least one embodiment of the present disclosure. The appearances of such phrases in various places in the description are not necessarily all referring to the same embodiment, nor are separate or alternative embodiments mutually exclusive of other embodiments. It will be understood by those skilled in the art, both explicitly and implicitly, that the embodiment described herein can be combined with other embodiments.

The mobile terminal related to the embodiments of the present disclosure may include various handheld devices, vehicular devices, wearable devices, computing devices, or other processing devices connected to wireless modems having the wireless communication function, and various types of user equipments (UE), mobile stations (MS), terminal devices, and so on.

The embodiments of the present disclosure are described in detail below.

Figure 1A:
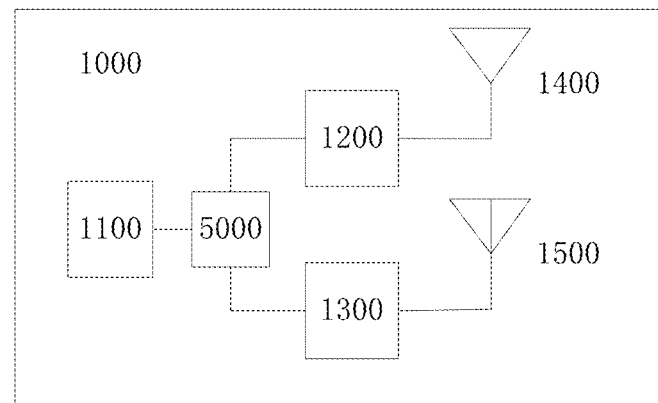
FIG. 1A is a structural schematic view of a mobile terminal provided by an embodiment of the present disclosure.

Referring to FIG. 1A, FIG. 1A is a structural schematic view of a mobile terminal 1000 provided by an embodiment of the present disclosure. The mobile terminal includes: an application processor 1100, a cellular network communication circuit 1200 and a local area network (LAN) communication circuit 1300, a first antenna 1400 and a second antenna 1500.

The application processor 1100, the cellular network communication circuit 1200, and the LAN communication circuit 1300 implement mutual communication through a global communication interface 5000, the cellular network communication circuit 1200 is connected with the first antenna 1400, and the LAN communication circuit 1300 is connected with the second antenna 1500.

When the application processor 1100 implements an enhanced signal transceiver function in a LAN through the LAN communication circuit 1300, the cellular network communication circuit 1200, and the first antenna 1400, an effective transmission distance of a signal transmitted by the mobile terminal is larger than a preset distance.

The global communication interface 5000 can be a communication bus interface (also known as global bus/global interface).

The application processor 1100 is a control center of the mobile terminal, utilizes various interfaces and lines to connect multiple parts of the whole mobile terminal, and by operating or performing software programs and/or circuits stored in a storage, and calling data stored in the storage, performs various functions of the mobile terminal and processes data, thereby performing overall monitoring for the mobile terminal. Wherein, the application processor mainly processes the operation system, the user interface, applications, and so on.

The preset distance can be 500 m, 1 km, and so on, and is not limited here. In particular, it can be implemented by configuring software and hardware parameters of the LAN communication circuit. Communication protocols supported by the LAN communication circuit include, but are not limited to, any one of the following: Bluetooth protocol, wireless high-fidelity (Wi-Fi) protocol, and ZigBee protocol. On the basis of conventional LAN wireless protocols, the mobile terminal uses a radio frequency (RF) front end of the cellular network communication circuit to improve the output power of LAN wireless communication signals and the sensitivities of receivers and lower the bandwidth, thereby improving the point-to-point communication distance of an Ad Hoc network of mobile terminals.

It can be seen that, in this embodiment of the present disclosure, the mobile terminal can implement the enhanced signal transceiver function through the cellular network communication circuit and the LAN communication circuit, thereby improving an effective distance of performing LAN communication of the mobile terminal. It is conducive to enlarge the using scope of the LAN communication function of the mobile terminal, meet various needs of specific scenarios such as the absence of a mobile network, and expand functionality and applicability.

Figure 1B:
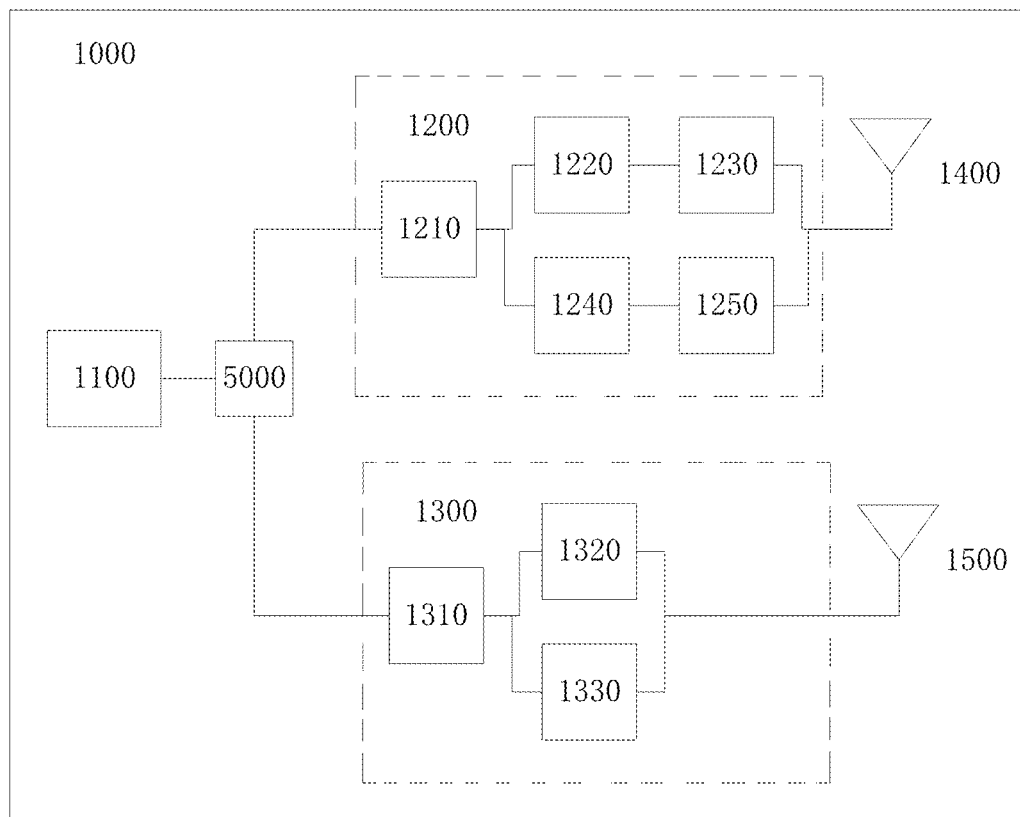
FIG. 1B is a structural schematic view of another mobile terminal provided by an embodiment of the present disclosure.

In a possible example, as shown in FIG. 1B, the cellular network communication circuit 1200 includes a first modem 1210, a first transmitter 1220, a power amplifier 1230, a first receiver 1240, and a low-noise filter 1250. The first modem 1210 is connected with the first transmitter 1220 and the first receiver 1240, the first transmitter 1220 is connected with the power amplifier 1230, the first receiver 1240 is connected with the lower-noise filter 1250, and the power amplifier 1230 and the low-noise filter 1250 are connected with the first antenna 1400. The LAN communication circuit 1300 includes a second modem 1310, a second transmitter 1320, and a second receiver 1330. The second modem 1310 is connected with the second transmitter 1320 and the second receiver 1330, and the second transmitter 1320 and the second receiver 1330 are connected to the second antenna 1500. The application processor 1100, the first modem 1210, and the second modem 1310 implement mutual communication through the global communication interface 5000.

A signal transmission path formed by the second modem 1310, the first modem 1210, the first transmitter 1220, the power amplifier 1230, and the first antenna 1400 is used to implement an enhanced signal transmission function in a LAN. A signal reception path formed by the first antenna 1400, the low-noise filter 1250, the first receiver 1240, the first modem 1210, and the second modem 1310 is used to implement an enhanced signal reception function in a LAN.

A signal transmission distance corresponding to the enhanced signal transmission function and the enhanced signal reception function is larger than the present distance, and the enhanced signal transceiver function includes the enhanced signal transmission function and the enhanced signal reception function.

It can be seen that, in this example, the second modem, the first modem, the first transmitter, the power amplifier, and the first antenna of the mobile terminal form the signal transmission path, and the first antenna, the low-noise filter, the first receiver, the first modem, and the second modem form the signal reception path; the signal transmission path can implement the enhanced signal transmission function in a LAN, and the signal reception path can implement the enhanced signal reception function in a LAN, such that the mobile terminal can implement LAN long-distance communication and is applicable to communication requirements for specific scenarios such as outdoor.

In a possible example, the application processor transmits first text data through the signal transmission path; and the application processor receives second text data through the signal reception path.

It can be seen that, in this example, the data type supported to transmit by the signal transmission path and the signal reception path of the mobile terminal includes text data, such that the mobile terminal can transmit information such as maps, images, locations, etc., and achieve text information sharing in a LAN.

Figure 1C:
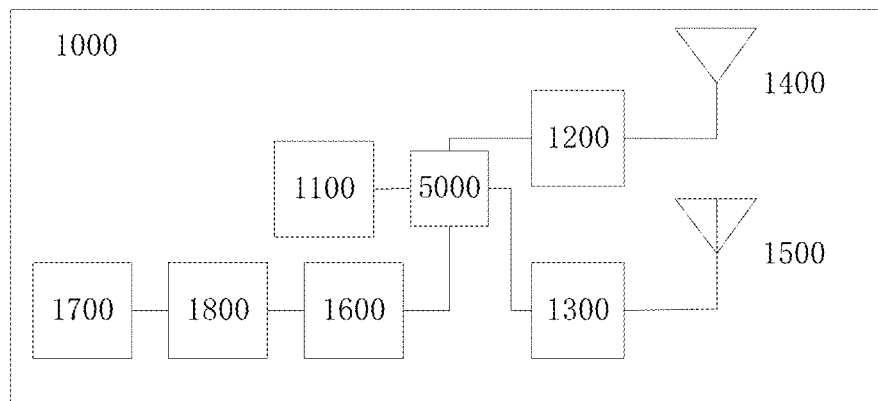
FIG. 1C is a structural schematic view of another mobile terminal provided by an embodiment of the present disclosure.

In a possible example, as shown in FIG. 1C, the mobile terminal further includes a digital signal processor 1600, a microphone 1700, and an audio encoder 1800; the microphone 1700 is connected with the encoder 1800, the audio encoder 1800 is connected with the digital signal processor 1600, and the digital signal processor 1600 is connected with the LAN communication circuit 1300 through the global communication interface 5000.

The application processor 1100 generates and transmits voice data through a voice transmission path. The voice transmission path includes the microphone 1700, the audio encoder 1800, the digital signal processor 1600, and the signal transmission path.

It can be seen that, in this example, the mobile terminal can generate voice data through a local microphone, and achieve transmitting the voice data over a long distance in a LAN through the audio encoder, the digital signal processor, and the signal transmission path.

Figure 1D:
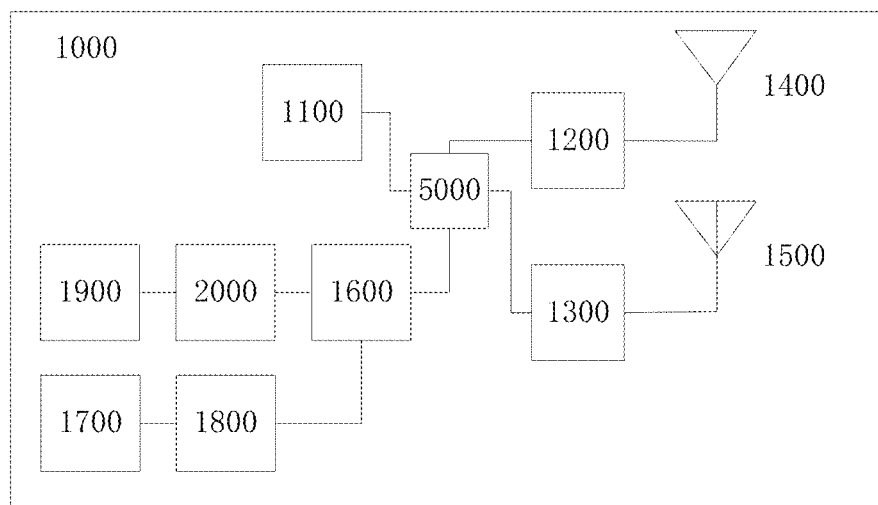
FIG. 1D is a structural schematic view of another mobile terminal provided by an embodiment of the present disclosure.

In a possible example, as shown in FIG. 1D, the mobile terminal further includes a speaker 1900 and an audio decoder 2000. The speaker 1900 is connected with the audio decoder 2000, the audio decoder 2000 is connected with the digital signal processor 1600, and the digital signal processor 1600 is connected with the LAN communication circuit 1300 through the global communication interface.

The application processor 1100 receives and broadcasts voice data through a voice reception path. The voice reception path includes the signal reception path, the digital signal processor 1600, the speaker 1900, and the audio decoder 2000.

It can be seen that, in this example, the mobile terminal can receive and broadcast voice data through a local voice reception path, and achieve processing voice data in a long distance in a LAN, and thus improve LAN communication capability of the mobile terminal.

Figure 1E:
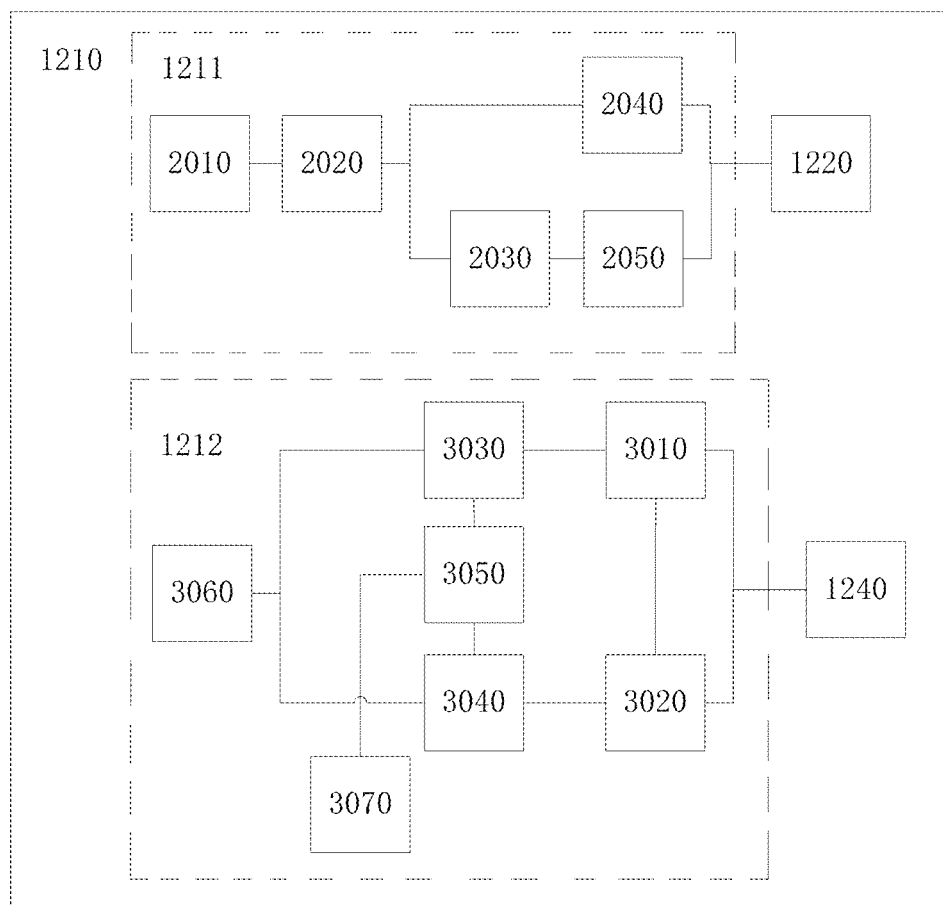
FIG. 1E is a structural schematic view of a first modem provided by an embodiment of the present disclosure.

In a possible example, as shown in FIG. 1E, the first modem 120 includes a first modulation processing circuit 1211 and a first demodulation circuit 1212; the first modulation processing circuit 2111 includes a first digital signal processing chip 2010, a coordinate rotation calculation circuit 2020, a differential circuit 2030, a first digital to analog (D/A) converter 2040, and a second D/A converter 2050; the first demodulation processing circuit 1212 includes a first analog to digital (A/D) converter 3010, a second A/D converter 3020, a first mixer 3030, a second mixer 3040, a second IQ phase modulation circuit 3050, a second digital signal processing chip 3060, and a second local oscillator 3070.

The first digital signal processing chip 2010 is connected with the coordinate rotation calculation circuit 2020, the coordinate rotation calculation circuit 2020 is connected with the first D/A converter 2040 and the differential circuit 2030, the differential circuit 2030 is connected with the second D/A converter 2050, and the first D/A converter 2040 and the second A/D converter 3020 are connected with the first transmitter 1220.

The first receiver 1240 is connected with the first A/D converter 3010 and the second A/D converter 3020, the first A/D converter 3010 is connected with the first mixer 3030, the second A/D converter 3020 is connected with the second mixer 3040, the first mixer 3030 and the second mixer 3040 are connected with the second digital signal processing chip 3060, the first mixer 3030 and the second mixer 3040 are connected with the second IQ phase modulation circuit 3050, the second IQ phase modulation circuit 3050 is connected with the second local oscillator 3070, and the first A/D converter 3010 is connected with the second A/D converter 3020.

A clock of the first modem is adjustable, and the enhanced type can directly divide an original frequency by 8 or 16 to achieve low-rate transmission.

Figure 1F:
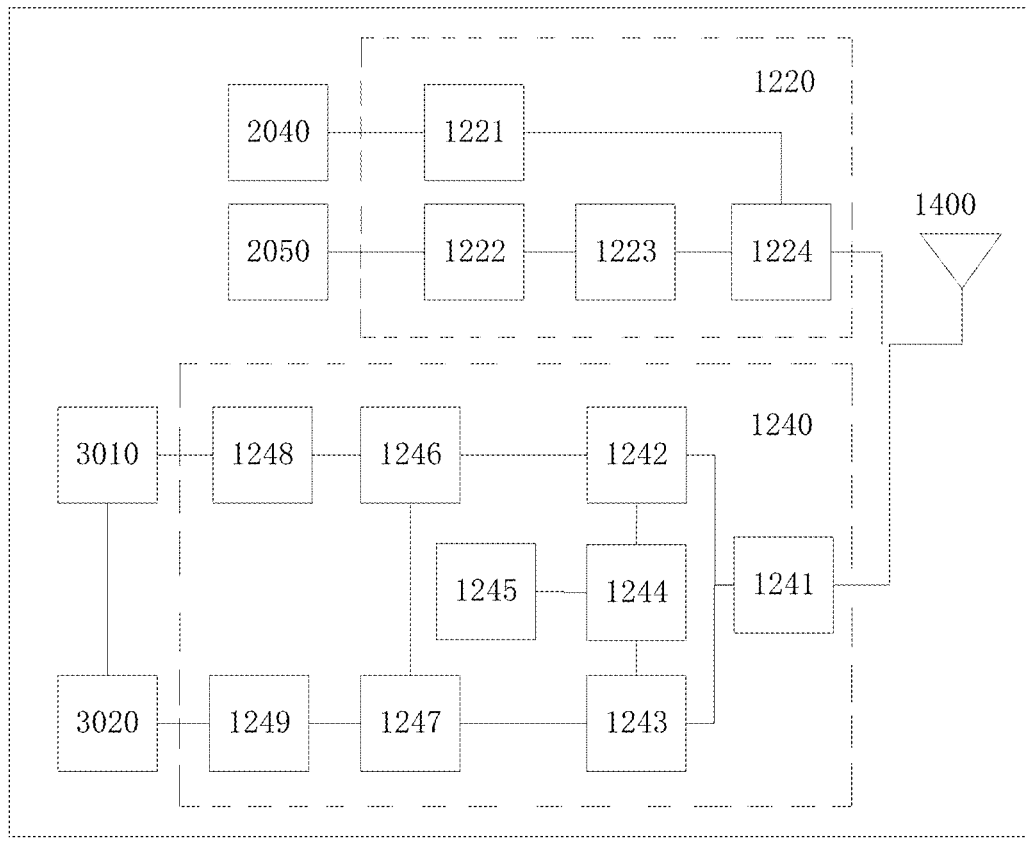
FIG. 1F is a structural schematic view of a first transmitter provided by an embodiment of the present disclosure.

In a possible example, as shown in FIG. 1F, the first transmitter 1220 includes a first low-pass filter 1221, a second low-pass filter 1222, a phase-locked loop circuit 1223, and an integrated power amplifier 1224; the first receiver 1240 includes an integrated low-noise filter 1241, a third mixer 1242, a fourth mixer 1243, a first IQ phase modulation circuit 1244, a first local oscillator 1245, a first image rejection filter 1246, a second image rejection filter 1247, a first gain adjustable amplifier 1248, and a second gain adjustable amplifier 1249.

The first D/A converter 2040 is connected with the first low-pass filter 1221, the second D/A converter 2050 is connected with the second low-pass filter 1222, the second low-pass filter 1222 is connected with the phase-locked loop circuit 1223, the first low-pass filter 1221 and the phase-locked loop circuit 1223 are connected with the integrated power amplifier 1224, and the integrated power amplifier 1224 is connected with the first antenna 1400.

The first antenna 1400 is connected with the integrated low-noise filter 1241, the integrated low-noise filter 1241 is connected with the third mixer 1242 and the fourth mixer 1243, the third mixer 1242 and the fourth mixer 1243 are connected with the first IQ phase modulation circuit 1244, the first IQ phase modulation circuit 1244 is connected with the first local oscillator 1245, the third mixer 1242 is connected with the first image rejection filter 1246, the fourth mixer 1243 is connected with the second image rejection filter 1247, the first image rejection filter 1246 is connected with the first gain adjustable amplifier 1348, the first gain adjustable amplifier 1248 is connected with the first A/D converter 3010, the second image rejection filter 1247 is connected with the second gain adjustable amplifier 1249, the second gain adjustable amplifier 1249 is connected with the second A/D converter 3020, and the first image rejection filter 1246 is connected with the second image rejection filter 1247.

The first transmitter adopts a polar architecture to improve the efficiencies of the power amplifiers and reduce the requirement for the peak-to-average ratio (PAPR) norm. The analog to digital converter (ADC) of the first receiver adopts Quadrature bandpass SD-ADC, since the central frequency and bandwidth of the SD-ADC are adjustable, based on conventional and enhanced signal bandwidths, an optimal NTF is obtained and suppress quantization noise. The clock of the first modem is adjustable, and the enhanced type can directly divide the original frequency by 8 or 16 to achieve low-rate transmission.

In a possible example, the second modem of the LAN communication circuit is connected with the power amplifier and the low-noise filter of the cellular network communication circuit.

The second modem is configured to transmit a first control signal to the power amplifier, the first control signal is configured to adjust a first configuration parameter of the power amplifier, and the first configuration parameter includes at least one of the following: transmission power, and signal bandwidth.

The second modem is configured to transmit a second control signal to the low-noise filter, the second control signal is configured to adjust a second configuration parameter of the low-noise filter, and the second configuration parameter includes at least one of the following: reception power, reception sensitivity, and signal bandwidth.

In a possible example, the signal of the enhanced signal transceiver function is ranged in industrial, scientific, and medical ISM frequency bands.

An actual bandwidth of the LAN signal is less than or equal to 15 kHz.

The enhanced signal transceiver function adopts duplex communication.

The communication method of devices in the Ad Hoc network can include half-duplex or full-duplex communication methods, and the specifically supported functional modes include, for example, a walkie-talkie mode, a Wechat audio message mode, a real-time voice call mode, etc., and are not limited here.

Figure 2A:
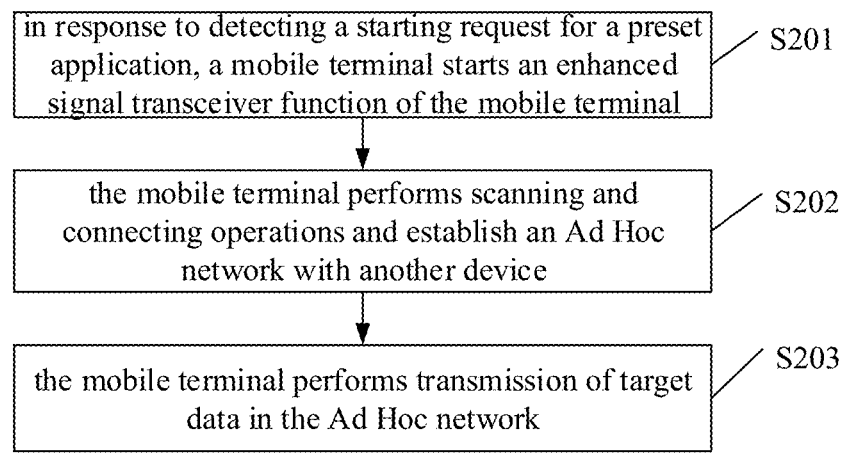
FIG. 2A is a schematic flow chart of a data transmission method provided by an embodiment of the present disclosure.

Referring to FIG. 2A, FIG. 2A is a schematic flow chart of a data transmission method provided by an embodiment of the present disclosure, which is applied in a mobile terminal according to any one of FIGS. 1A to 1F. As shown in the figure, the data transmission method includes the following steps.

S201, in response to detecting a starting request for a preset application, an enhanced signal transceiver function of a mobile terminal is started.

The preset application can be a system application, and can also be a third-party application; it is not limited here.

S202, the mobile terminal performs scanning and connecting operations and establish an Ad Hoc network with another device, wherein a distance between the another device and the mobile terminal is less than or equal to a preset distance.

The communication methods of the devices in the Ad Hoc network not only include a walkie-talkie mode or a Wechat audio message mode, but also include real-time duplex communication, for example, performing a real-time voice call.

S203, the mobile terminal performs transmission of target data in the Ad Hoc network.

It can be seen that, in the embodiments of the present disclosure, in response to detecting a starting request for a preset application, a mobile terminal firstly starts an enhanced signal transceiver function of the mobile terminal; secondly, scanning and connecting operations are performed and establish an Ad Hoc network with another device, wherein a distance between the another device and the mobile terminal is less than or equal to the preset distance; and finally, transmission of target data is performed in the Ad Hoc network. It can be seen that the mobile terminal can establish the Ad Hoc network with other devices and implement a long-distance data transmission in a LAN by starting the enhanced signal transceiver function, thereby improving an effective distance of performing LAN communication of the mobile terminal. It is conducive to enlarge the using scope of the LAN communication function of a mobile terminal, meet various needs of specific scenarios such as the absence of a mobile network, and expand functionality and applicability.

In a possible example, the mobile terminal includes a cellular network communication circuit and a LAN communication circuit; that the mobile terminal starts the enhanced signal transceiver function of the mobile terminal includes: the mobile terminal enabling the cellular network communication circuit and the LAN communication circuit; establishing a signal transmission path between the cellular network communication circuit and the LAN communication circuit.

In a possible example, the target data includes at least one of the following: voice data, location data, map data, and address book data.

It can be seen that, in this example, the data types supported to be transmitted by the mobile terminal are more comprehensive and improve applicability.

In a possible example, the target data of the mobile terminal is location data and voice data, and the location data is global navigation satellite system (GNSS) information; the method further includes: the mobile terminal displaying a preset interface, wherein the preset interface includes a location display area and a contact display area; displaying the voice data in the contact display area; and performing location display in the location display area according to the location data.

The preset interface is a pre-configured functional interface configured to display the target data.

Figure 2B:
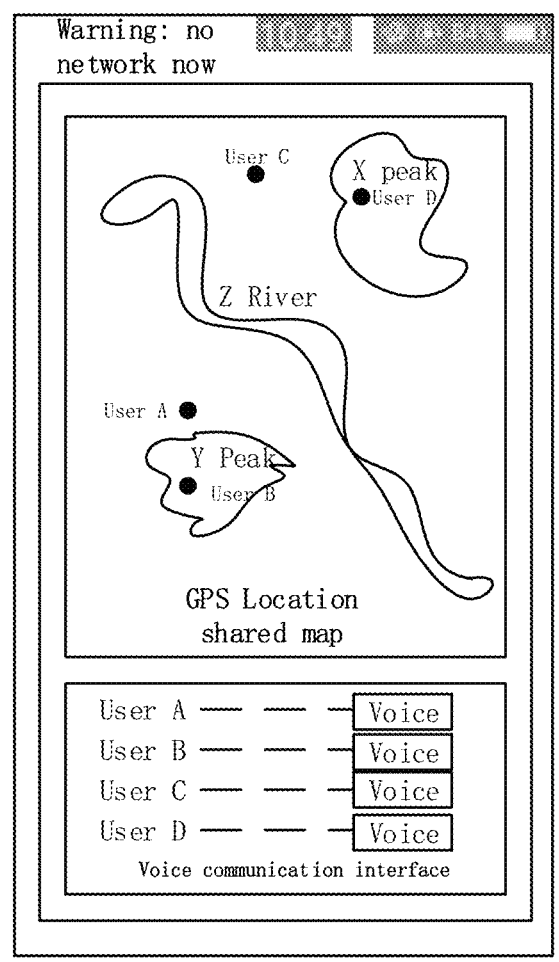
FIG. 2B is an exemplary view of a preset interface provided by an embodiment of the present disclosure.

For example, as shown in FIG. 2B, assuming that the LAN where the LAN communication circuit is located includes a user A, a user B, a user C, and a user D, and the user A, the user B, the user C, and the user D directly share location information; in particular, the mobile terminal can receive location information shared by other users in the current LAN, display an offline map in the location display area of a preset interface, display corresponding location information on the offline map, and display audio messages of all users in the contact display area, thereby implementing the LAN voice communication function.

It can be seen that, in this example, the mobile terminal, in the process of transmitting the target data in the LAN, can synchronously show the target data through a preset interface, such that users can inquire in demand in an interactive interface, and convenience of using data is improved.

In a possible example, the target data is address book data; the method further includes: the mobile terminal displaying a preset interface, wherein the preset interface includes the address book data; searching communication information of a target user in the address book data according to an inquiry request of a user.

It can be seen that, in this example, the mobile terminal supports long-distance sharing of address book data in a LAN, improves safety and convenience, and is applicable to requirements of specific scenarios.

In a possible example, the method further includes: the mobile terminal transmitting a networking request to the another device; receiving a networking response from a target device, and transmitting networking data through the target device; wherein the networking data is data that needs to be transmitted through a mobile network.

Since the local end of the mobile terminal may remain in a disconnected state, in this case, if a user needs to transmit data over a network, it is required to use other devices in the current LAN to carry out relay communication. The target device is in a networked state, can transmit a networking response to the mobile terminal and forward networking data of the mobile terminal.

It can be seen that, in this example, the mobile terminal transfers data that needs to be transmitted through a mobile network through a target device in a LAN, thereby achieving communication with the outside and improving communication capability of the mobile terminal.

In a possible example, the method further includes: in response to detecting that the local end is in a networked state, the mobile terminal sending a network notification to the another device; receiving the networking request from the target device, and forwarding networking data of the target device; the networking data is data that needs to be transmitted through a mobile network.

It can be seen that, in this example, the local end of the mobile terminal, in response to detecting a state capable of connecting to a network, can send a networking notification to another device in a LAN, thereby providing a networking service for a target device having a networking need, and expanding communication capability of the mobile terminal.

Figure 3:
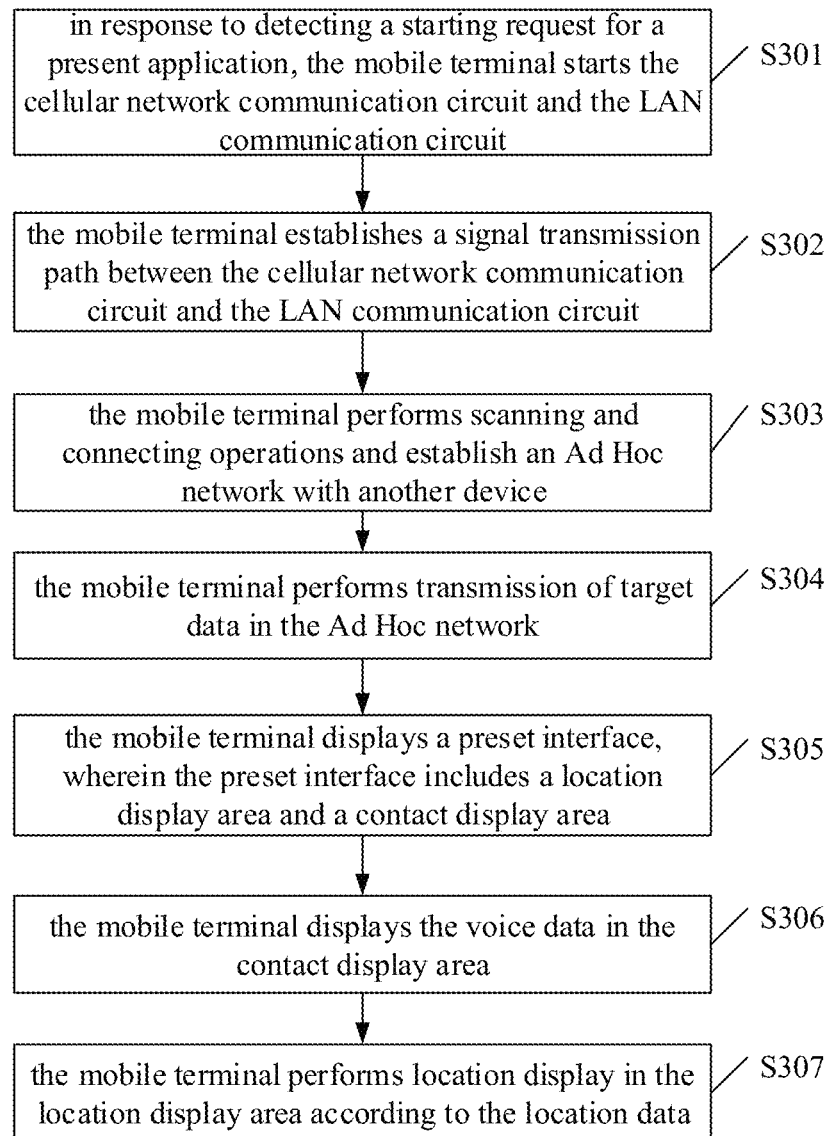
FIG. 3 is a schematic flow chart of another data transmission method provided by an embodiment of the present disclosure.

In consistence with the embodiment shown in FIG. 2A, referring to FIG. 3, FIG. 3 is a schematic flow chart of a data transmission method provided by an embodiment of the present disclosure, which is applied in a mobile terminal according to any one of FIGS. 1A to 1F. As shown in the figure, the data transmission method includes the following steps.

S301, in response to detecting a starting request for a present application, the mobile terminal starts the cellular network communication circuit and the LAN communication circuit.

S302, the mobile terminal establishes a signal transmission path between the cellular network communication circuit and the LAN communication circuit.

S303, the mobile terminal performs scanning and connecting operations and establishes an Ad Hoc network with another device, wherein a distance between the another device and the mobile terminal is less than or equal to the preset distance.

S304, the mobile terminal performs transmission of target data in the Ad Hoc network, wherein the target data is location data and voice data, and the location data is global navigation satellite system (GNSS) information.

S305, the mobile terminal displays a preset interface, wherein the preset interface includes a location display area and a contact display area.

S306, the mobile terminal displays the voice data in the contact display area.

S307, the mobile terminal performs location display in the location display area according to the location data.

It can be seen that, in the embodiments of the present disclosure, in response to detecting a starting request for a preset application, a mobile terminal firstly starts an enhanced signal transceiver function of the mobile terminal; secondly, scanning and connecting operations are performed and establish an Ad Hoc network with another device, wherein a distance between the another device and the mobile terminal is less than or equal to the preset distance; and finally, transmission of target data is performed in the Ad Hoc network. It can be seen that the mobile terminal can establish the Ad Hoc network with other devices and implement a long-distance data transmission in a LAN by starting the enhanced signal transceiver function, thereby improving an effective distance of performing LAN communication of the mobile terminal. It is conducive to enlarge the using scope of the LAN communication function of a mobile terminal, meet various needs of specific scenarios such as the absence of a mobile network, and expand functionality and applicability.

Furthermore, the mobile terminal, in the process of transmitting the target data in the LAN, can synchronously show the target data through a preset interface, such that users can inquire in demand in an interactive interface, and convenience of using data is improved.

Figure 4:
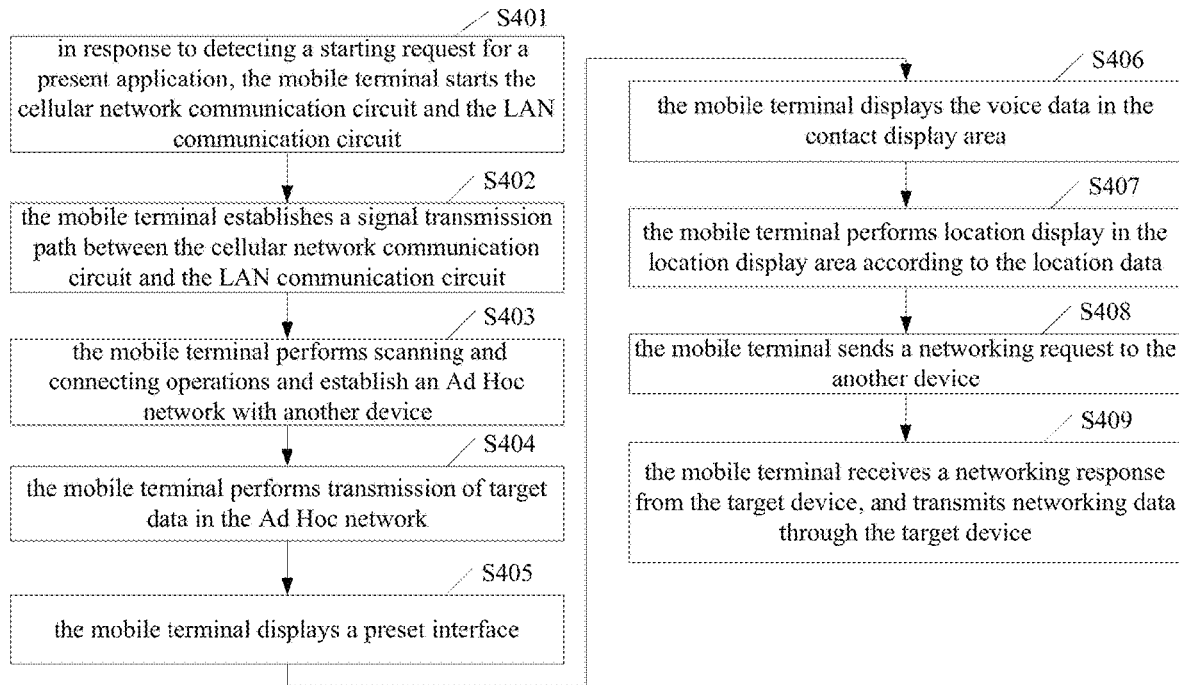
FIG. 4 is a schematic flow chart of another data transmission method provided by an embodiment of the present disclosure.

In consistence with the embodiment shown in FIG. 2A, referring to FIG. 4, FIG. 4 is a schematic flow chart of a data transmission method provided by an embodiment of the present disclosure, which is applied in a mobile terminal according to any one of FIGS. 1A to 1F. As shown in the figure, the data transmission method includes the following steps.

S401, in response to detecting a starting request for a present application, the mobile terminal starts the cellular network communication circuit and the LAN communication circuit.

S402, the mobile terminal establishes a signal transmission path between the cellular network communication circuit and the LAN communication circuit.

S403, the mobile terminal performs scanning and connecting operations and establishes an Ad Hoc network with another device, wherein a distance between the another device and the mobile terminal is less than or equal to the preset distance.

S404, the mobile terminal performs transmission of target data in the Ad Hoc network, wherein the target data is location data and voice data, and the location data is global navigation satellite system (GNSS) information.

S405, the mobile terminal displays a preset interface, wherein the preset interface includes a location display area and a contact display area.

S406, the mobile terminal displays the voice data in the contact display area.

S407, the mobile terminal performs location display in the location display area according to the location data.

S408, the mobile terminal sends a networking request to the another device.

S409, the mobile terminal receives a networking response from the target device, and transmits networking data through the target device, wherein the networking data is data that needs to be transmitted through a mobile network.

It can be seen that, in the embodiments of the present disclosure, in response to detecting a starting request for a preset application, a mobile terminal firstly starts an enhanced signal transceiver function of the mobile terminal; secondly, scanning and connecting operations are performed and establish an Ad Hoc network with another device, wherein a distance between the another device and the mobile terminal is less than or equal to the preset distance; and finally, transmission of target data is performed in the Ad Hoc network. It can be seen that the mobile terminal can establish the Ad Hoc network with other devices and implement a long-distance data transmission in a LAN by starting the enhanced signal transceiver function, thereby improving an effective distance of performing LAN communication of the mobile terminal. It is conducive to enlarge the using scope of the LAN communication function of a mobile terminal, meet various needs of specific scenarios such as the absence of a mobile network, and expand functionality and applicability.

Furthermore, the mobile terminal, in the process of transmitting the target data in the LAN, can synchronously show the target data through a preset interface, such that users can inquire in demand in an interactive interface, and convenience of using data is improved.

Furthermore, the mobile terminal transfers data that needs to be transmitted through a mobile network through a target device in a LAN, thereby achieving communication with the outside and improving communication capability of the mobile terminal.

Figure 5:
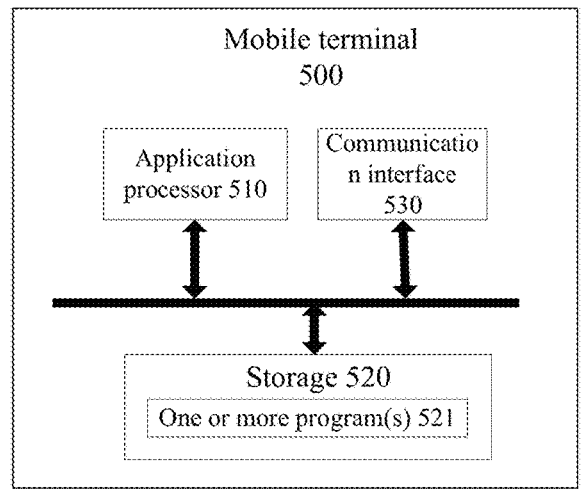
FIG. 5 is a structural schematic view of a mobile terminal provided by an embodiment of the present disclosure.

In consistence with the embodiments shown in FIG. 2A, FIG. 3, and FIG. 4, referring to FIG. 5, FIG. 5 is a structural schematic view of a mobile terminal 500 provided by an embodiment of the present disclosure. As shown in the figure, the mobile terminal 500 includes an application processor 510, a storage 520, a communication interface 530, and one or more program(s) 521; wherein, the one or more program(s) 521 is/are stored in the storage 520, and is/are configured to be executed by the application processor 510; the one or more program(s) 521 include(s) instruction used to execute the following steps.

In response to detecting a starting request for a preset application, the enhanced signal transceiver function of the mobile terminal is started.

Scanning and connecting operations and establish an Ad Hoc network with another device are performed, wherein a distance between the another device and the mobile terminal is less than or equal to the preset distance.

Transmission of target data in the Ad Hoc network is performed.

It can be seen that, in the embodiments of the present disclosure, in response to detecting a starting request for a preset application, a mobile terminal firstly starts an enhanced signal transceiver function of the mobile terminal; secondly, scanning and connecting operations are performed and establish an Ad Hoc network with another device, wherein a distance between the another device and the mobile terminal is less than or equal to the preset distance; and finally, transmission of target data is performed in the Ad Hoc network. It can be seen that the mobile terminal can establish the Ad Hoc network with other devices and implement a long-distance data transmission in a LAN by starting the enhanced signal transceiver function, thereby improving an effective distance of performing LAN communication of the mobile terminal. It is conducive to enlarge the using scope of the LAN communication function of a mobile terminal, meet various needs of specific scenarios such as the absence of a mobile network, and expand functionality and applicability.

In a possible example, the mobile terminal includes a cellular network communication circuit and a LAN communication circuit; starting the enhanced signal transceiver function of the mobile terminal includes: starting the cellular network communication circuit and the LAN communication circuit; and establishing a signal transmission path between the cellular network communication circuit and the LAN communication circuit.

In a possible example, the target data includes at least one of the following: voice data, location data, map data, and address book data.

In a possible example, the target data is location data and voice data, and the location data is global navigation satellite system (GNSS) information; the program(s) further include(s) instruction used to execute the following operations: displaying a preset interface, wherein the preset interface includes a location display area and a contact display area; displaying the voice data in the contact display area; and performing location display in the location display area according to the location data.

In a possible example, the target data is address book data; the program(s) further include(s) instruction used to execute the following operations: displaying a preset interface, wherein the preset interface includes the address book data; and searching communication information of a target user in the address book data according to an inquiry request of a user.

In a possible example, the program(s) further include(s) instruction used to execute the following operations: sending a networking request to the another device; and receiving a networking response from the target device, and transmitting networking data through the target device; wherein the networking data is data that needs to be transmitted through a mobile network.

In a possible example, the program(s) further include(s) instruction used to execute the following operations: in response to detecting that a local end is in a networking state, sending networking notification to the another device; and receiving a networking request from a target device, and forwarding networking data of the target device; wherein the networking data is data that needs to be transmitted through a mobile network.

The above description mainly introduces the solutions of the embodiments of the present disclosure from the perspective of the method side execution process. It can be understood that, in order to implement the above functions, the mobile terminal includes corresponding hardware structures and/or software circuits for performing various functions. One of ordinary skill in the art will readily appreciate that the present application can be implemented by means of hardware or a combination of hardware and computer software in combination with the elements and algorithm steps of the various examples described in the embodiments provided herein. Whether a function is implemented by means of hardware or computer software driving hardware depends on the specific application and design constraints of the technical solution. One of ordinary skill in the art can use different methods for each particular application to implement the described functionality, but such implementation should not be considered to be beyond the scope of the present disclosure.

The embodiments of the present disclosure may divide the mobile terminal into functional units according to the foregoing method examples. For example, each functional unit may be divided according to each function, or two or more functions may also be integrated into one processing unit. The above integrated units can be implemented in the form of hardware or in the form of software functional units. It should be noted that the division of the units in the embodiments of the present disclosure is schematic, and is only a logical function division. In actual implementation, there may be other division manners.

Figure 6:
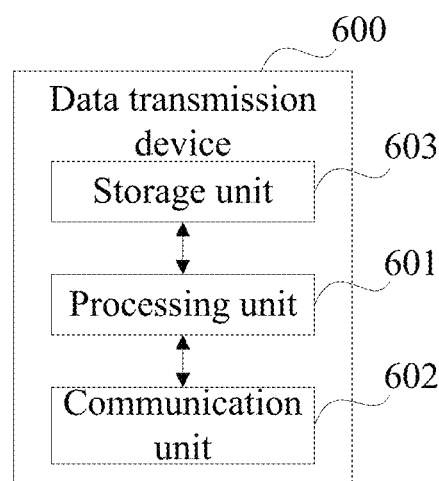
FIG. 6 is a functional unit block diagram of a data transmission device provided by an embodiment of the present disclosure.

FIG. 6 is a functional unit block diagram of a data transmission device 600 related to an embodiment of the present disclosure. The data transmission device 600 is applied in the mobile terminal as shown in FIG. 1. The data transmission device 600 includes a processing unit 601 and a communication unit 620.

The processing unit 601 is configured to: in response to detecting a starting request for a preset application, start the LAN communication circuit through the communication unit 602; adjusting a working mode of the LAN communication circuit into a non-bypass mode; perform scanning and connecting operations and establish an Ad Hoc network with another device, wherein a distance between the another device and the mobile terminal is less than or equal to the preset distance; and perform transmission of target data in the Ad Hoc network.

The data transmission device can further include a storage unit 603 configured to store program codes and data of the mobile terminal. The processing unit 601 can be an application processor, the communication unit 602 can be a global communication bus, a transceiver, etc., and the storage unit 603 can be a memory.

It can be seen that, in the embodiments of the present disclosure, in response to detecting a starting request for a preset application, a mobile terminal firstly starts an enhanced signal transceiver function of the mobile terminal; secondly, scanning and connecting operations are performed and establish an Ad Hoc network with another device, wherein a distance between the another device and the mobile terminal is less than or equal to the preset distance; and finally, transmission of target data is performed in the Ad Hoc network. It can be seen that the mobile terminal can establish the Ad Hoc network with other devices and implement a long-distance data transmission in a LAN by starting the enhanced signal transceiver function, thereby improving an effective distance of performing LAN communication of the mobile terminal. It is conducive to enlarge the using scope of the LAN communication function of a mobile terminal, meet various needs of specific scenarios such as the absence of a mobile network, and expand functionality and applicability.

In a possible example, the mobile terminal includes a cellular network communication circuit and a LAN communication circuit; in an aspect of starting the enhanced signal transceiver function of the mobile terminal, the processing unit is specifically configured to: start the cellular network communication circuit and the LAN communication network; and establish a signal transmission path between the cellular network communication circuit and the LAN communication circuit.

In a possible example, the target data includes at least one of the following: voice data, location data, map data, and address book data.

In a possible example, the target data is location data and voice data, and the location data is global position data (GPS) information; the processing unit 601 is further configured to: display a preset interface, wherein the preset interface includes a location display area and a contact display area; display the voice data in the contact display area; and perform location display in the location display area according to the location data through the communication unit 602.

In a possible example, the target data is address book data; the processing unit 601 is further configured to: display a preset interface, wherein the preset interface includes the address book data; and searching communication information of a target user in the address book data according to an inquiry request of a user.

In a possible example, the processing unit 601 is further configured to: send a networking request to the another device through the communication unit 602; and receive a networking response from a target device through the communication unit 602, and transmit networking data through the target device; wherein the networking data is data that needs to be transmitted through a mobile network.

In a possible example, the processing unit 601 is further configured to: in response to detecting that a local end is in a networking state, send a networking notification to the another device through the communication unit 602; receive a networking request from a target device through the communication unit 602, and forward networking data of the target device; wherein the networking data is data that needs to be transmitted through a mobile network.

A computer storage medium is further provided in embodiments of the present disclosure. The computer storage medium stores computer programs for electronic data exchange. The computer programs cause a computer to perform some or all of the steps of any of the methods described in the foregoing method embodiments. The above computer includes a mobile terminal.

A computer program product is provided in embodiments of the present disclosure. The computer program product includes a non-transitory computer readable storage medium storing a computer program. The computer program can be operated to cause a computer to perform some or all of the steps of any of the methods described in the foregoing method embodiments. The computer program product can be a software installation package, and the above computer includes a mobile terminal.

It should be noted that, for the foregoing method embodiments, for the sake of brevity, they are all described as a series of action combinations, but those skilled in the art should understand that the present disclosure is not limited by the described action sequence. Because certain steps may be performed in other sequences or concurrently in accordance with the present disclosure. In the following, those skilled in the art should also understand that the embodiments described in the specification are all preferred embodiments, and the actions and circuits involved are not necessarily required by the present disclosure.

In the above embodiments, the descriptions of the various embodiments are all focused on, and the parts that are not detailed in a certain embodiment can be referred to the related descriptions of other embodiments.

In several embodiments provided herein, it should be understood that the disclosed apparatus may be implemented in other ways. For example, the device embodiments described above are merely illustrative. For example, the division of the above units is only a logical function division. In actual implementation, there may be another division manner. For example, multiple units or components may be combined or integrated to another system, or some features can be ignored or not executed. In addition, the mutual coupling or direct coupling or communication connection shown or discussed may be an indirect coupling or communication connection through some interface, device or unit, and may be electrical or otherwise.

The units described above as separate components may be or may not be physically separated, and the components illustrated as units may be or may not be physical units, which may be located in one place, or may be distributed to multiple network units. Some or all of the units may be selected according to actual needs to achieve the purpose of the solution of the embodiment.

In addition, each functional unit in each embodiment of the present disclosure may be integrated into one processing unit, or each unit may exist physically separately. Alternatively, two or more units may also be integrated into one unit. The above integrated unit can be implemented in the form of hardware or in the form of a software functional unit.

The above-described integrated unit can be stored in a computer readable memory if it is implemented in the form of a software functional unit and sold or used as a standalone product. Based on such understanding, the technical solution of the present disclosure, in essence or the contribution to the prior art, or all or part of the technical solution may be embodied in the form of a software product. The software product is stored in a memory, which includes a number of instructions causing a computer device (which may be a personal computer, server or network device, etc.) to perform all or some of the steps of the above-described methods of various embodiments of the present disclosure. The foregoing memory includes various medium that can store program codes, such as a U disk, a Read-Only Memory (ROM), a Random Access Memory (RAM), a removable hard disk, a magnetic disk, or an optical disk, and the like.

One of ordinary skill in the art can understand that all or part of the various methods of the above embodiments can be completed by related hardware instructed by a program. The program can be stored in a computer readable memory, and the memory can include a flash drive, read-only memory (ROM), random access memory (RAM), disk or CD, etc.

The embodiments of the present disclosure have been described in detail above, and specific examples are used here and describe the principles and implementations of the present disclosure. The description of the above embodiments is only used to help understand the method of the present disclosure and its core ideas. For a person skilled in the art, there will have changes in both the specific embodiments and the using scope according to the idea of the present disclosure. In summary, the content of the present specification should not be construed as limiting the present disclosure.

What is claimed is:

1. A mobile terminal, comprising an application processor, a cellular network communication circuit, a LAN communication circuit, a first antenna, and a second antenna;
    wherein, the application processor, the cellular network communication circuit, and the LAN communication circuit implement mutual communication through a global communication interface, and the cellular network communication circuit is connected with the first antenna, and the LAN communication circuit is connected with the second antenna;
    wherein the application processor implements an enhanced signal transceiver function in a LAN through the LAN communication circuit, the cellular network communication circuit, and the first antenna; and
    wherein the enhanced signal transceiver function comprises an enhanced signal transmission function and an enhanced signal reception function; each of signal transmission distances corresponding to the enhanced signal transmission function and the enhanced signal reception function is larger than a preset distance; and the mobile terminal is provided therein with a signal transmission path configured to implement the enhanced signal transmission function and a signal reception path configured to implement the enhanced signal transmission function.

2. The mobile terminal according to claim 1, wherein, the cellular network communication circuit comprises a first modem, a first transmitter, a first receiver, a power amplifier, and a low-noise filter; the first modem is connected with the first transmitter and the first receiver, the first transmitter is connected with the power amplifier, the first receiver is connected with the low-noise filter, and the power amplifier and the low-noise filter are connected with the first antenna; the LAN communication circuit comprises a second modem, a second transmitter, and a second receiver, the second modem is connected with the second transmitter and the second receiver, and the second transmitter and the second receiver are connected with the second antenna, the application processor, the first modem, and the second modem implement mutual communication through the global communication interface; and
    the second modem, the first modem, the first transmitter, the power amplifier, and the first antenna form the signal transmission path; and the first antenna, the low-noise filter, the first receiver, the first modem, and the second modem form the signal reception path.

3. The mobile terminal according to claim 1, wherein, the application processor transmits first text data through the signal transmission path; and
    the application processor receives second text data through the signal reception path.

4. The mobile terminal according to claim 1, further comprising a digital signal processor, a microphone, and an audio encoder, wherein the microphone is connected with the audio encoder, the audio encoder is connected with the digital signal processor, and the digital signal processor is connected with the LAN communication circuit through the global communication interface; and
    the application processor generates and transmits voice data through a voice transmission path, and the voice transmission path comprises the microphone, the audio encoder, the digital signal processor, and the signal transmission path.

5. The mobile terminal according to claim 4, wherein, the mobile terminal further comprises a speaker and an audio decoder, the speaker is connected with the audio decoder, the audio decoder is connected with the digital signal processor, and the digital signal processor is connected with the LAN communication circuit through the global communication interface; and
    the application processor receives and broadcasts voice data through a voice reception path, and the voice reception path comprises the signal reception path, the digital signal processor, the speaker, and the audio decoder.

6. The mobile terminal according to claim 2, wherein, the first modem comprises a first modulation processing circuit and a first demodulation processing circuit; the first modulation processing circuit comprises a first digital signal processing chip, a coordinate rotation calculation circuit, a differential circuit, a first D/A converter, and a second D/A converter; and the first demodulation processing circuit comprises a first A/D converter, a second A/D converter, a first mixer, a second mixer, a second IQ phase modulation circuit, a second digital signal processing chip, and a second local oscillator;
    the first digital signal processing chip is connected with the coordinate rotation calculation circuit, the coordinate rotation calculation circuit is connected with the first D/A converter and the differential circuit, the differential circuit is connected with the second D/A converter, and the first D/A converter and the second D/A converter are connected with the first transmitter; and
    the first receiver is connected with the first A/D converter and the second A/D converter, the first A/D converter is connected with the first mixer, the second A/D converter is connected with the second mixer, the first mixer and the second mixer are connected with the second digital signal processing chip, the first mixer and the second mixer are connected with the second IQ phase modulation circuit, the second IQ phase modulation circuit is connected with the second local oscillator, and the first A/D converter is connected with the second A/D converter.

7. The mobile terminal according to claim 6, wherein, the first transmitter comprises a first low-pass filter, a second low-pass filter, a phase-locked loop circuit, and an integrated power amplifier; and the first receiver comprises an integrated low-noise filter, a third mixer, a fourth mixer, a first IQ phase modulation circuit, a first local oscillator, a first image rejection filter, a second image rejection filter, a first gain adjustable amplifier, and a second gain adjustable amplifier;

the first D/A converter is connected with the first low-pass filter, the second D/A converter is connected with the second low-pass filter, the second low-pass filter is connected with the phase-locked loop circuit, the first low-pass filter and the phase-locked loop circuit are connected with the integrated power amplifier, and the integrated power amplifier is connected with the first antenna; and the first antenna is connected with the integrated low-noise filter, the integrated low-noise filter is connected with the third mixer and the fourth mixer, the third mixer and the fourth mixer are connected with the first IQ phase modulation circuit, the first IQ phase modulation circuit is connected with the first local oscillator, the third mixer is connected with the first image rejection filter, the fourth mixer is connected with the second image rejection filter, the first image rejection filter is connected with the first gain adjustable amplifier, the first gain adjustable amplifier is connected with the first A/D converter, the second image rejection filter is connected with the second gain adjustable amplifier, the second gain adjustable amplifier is connected with the second A/D converter, the first image rejection filter is connected with the second image rejection filter, and the first A/D converter is connected with the second A/D converter.

8. The mobile terminal according to claim 7, wherein, second modem of the LAN communication circuit is connected with the power amplifier and the low-noise filter of the cellular network communication circuit;

the second modem is configured to send a first control signal to the power amplifier, the first control signal is configured to adjust a first configuration parameter of the power amplifier, and the first configuration parameter comprises at least one of the following: transmission and signal bandwidth; and the second modem is configured to send a second control signal to the low-noise filter, the second control signal is configured to adjust a second configuration parameter of the low-noise filter, and the second configuration parameter comprises at least one of the following: reception power, reception sensitivity, and signal bandwidth.

9. The mobile terminal according to claim 1, wherein, communication protocols supported by the LAN communication circuit include at least one of Bluetooth protocol, wireless high-fidelity (Wi-Fi) protocol, and Zig-Bee protocol.

10. A transmission method, which is applied in a mobile terminal, wherein the mobile terminal comprises a cellular network communication circuit, a first antenna connected with the cellular network communication circuit, and a LAN communication circuit communicating with the cellular network communication circuit, the method comprising:

in response to detecting a starting request for a preset application, starting an enhanced signal transceiver function in a LAN of the mobile terminal, wherein the enhanced signal transceiver function is implemented through the LAN communication circuit, the cellular network communication circuit, and the first antenna;

performing scanning and connecting operations and establishing an Ad Hoc network with another device, wherein a distance between the other device and the mobile terminal is less than or equal to a preset distance; and performing transmission of target data in the Ad Hoc network;

wherein the enhanced signal transceiver function comprises an enhanced signal transmission function and an enhanced signal reception function; each of signal transmission distances corresponding to the enhanced signal transmission function and the enhanced signal reception function is larger than a preset distance; and the mobile terminal is provided therein with a signal transmission path configured to implement the enhanced signal transmission function and a signal reception path configured to implement the enhanced signal transmission function.

11. The transmission method according to claim 10, wherein, the mobile terminal comprises a cellular network communication circuit and a LAN communication circuit, and starting the enhanced signal transceiver function of the mobile terminal comprises:

starting the cellular network communication circuit and the LAN communication circuit; and establishing the signal transmission path and the signal reception path between the cellular network communication circuit and the LAN communication circuit.

12. The transmission method according to claim 10, wherein, the target data comprises at least one of the following:

voice data, location data, map data, and address book data.

13. The transmission method according to claim 12, wherein, the target data is location data and voice data, the location data is global navigation satellite system (GNSS) information, and the method further comprises:

displaying a preset interface, wherein the preset interface comprises a location display area and a contact display area;

displaying the voice data in the contact display area; and performing location display in the location display area according to the location data.

14. The transmission method according to claim 12, wherein, the target data is address book data, and the method further comprises:

displaying a preset interface, wherein the preset interface comprises the address book data; and searching communication information of a target user in the address book data according to an inquiry request of a user.

15. The transmission method according to claim 10, further comprising:

sending a networking request to the other device; and receiving a networking response from a target device, and transmitting networking data through the target device, wherein the networking data is data that needs to be transmitted through a mobile network.

16. The transmission method according to claim 15, further comprising:
- in response to detecting that a local end is in a networking state, sending a networking notification to the other device; and
- receiving a networking request from the target device, and forwarding networking data of the target device, wherein the networking data is data that needs to be transmitted through a mobile network.

17. A mobile terminal, comprising: a cellular network communication circuit, a first antenna connected with the cellular network communication circuit, a LAN communication circuit communicating with the cellular network communication circuit, an application processor, a storage, a communication interface, and programs, wherein the programs are stored in the storage, and are configured to be executed by the application processor, and the programs comprise instruction configured to execute:
- starting an enhanced signal transceiver function in a LAN of the mobile terminal, wherein the enhanced signal transceiver function is implemented through the LAN communication circuit, the cellular network communication circuit, and the first antenna;
- establishing communication between the mobile terminal and another device, wherein a distance between the mobile terminal and the other device is less than or equal to a preset distance; and
- in response to a networking state of either one of the mobile terminal and the other device, transmitting data of the other of the mobile terminal and the other device through the mobile terminal or the other device in the networking state;
- wherein the enhanced signal transceiver function comprises an enhanced signal transmission function and an enhanced signal reception function; each of signal transmission distances corresponding to the enhanced signal transmission function and the enhanced signal reception function is larger than a preset distance; and the mobile terminal is provided therein with a signal transmission path configured to implement the enhanced signal transmission function and a signal reception path configured to implement the enhanced signal transmission function.

18. The mobile terminal according to claim 17, wherein, the programs further comprise instruction configured to execute:
- establishing an Ad Hoc network comprising the mobile terminal and the other device; and
- transmitting target data in the Ad Hoc network.

19. The mobile terminal according to claim 18, wherein, transmitting target data in the Ad Hoc network comprises transmitting the target data from the mobile terminal to the other device and transmitting the target data from the other device to the mobile terminal; and
the target data comprises at least one of the following:
voice data, location data, map data, and address book data.

* * * * *